United States Patent
Gupta et al.

(10) Patent No.: US 10,649,959 B2
(45) Date of Patent: May 12, 2020

(54) WRITE-OPTIMIZED NESTED TREES

(71) Applicant: VMware, Inc., Palo Alto, CA (US)

(72) Inventors: Abhishek Gupta, Sunnyvale, CA (US);
Richard P Spillane, Mountain View, CA (US); Kapil Chowksey, Cupertino, CA (US); Wenguang Wang, Santa Clara, CA (US); Robert T Johnson, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 195 days.

(21) Appl. No.: 15/717,613

(22) Filed: Sep. 27, 2017

(65) Prior Publication Data
US 2019/0095457 A1  Mar. 28, 2019

(51) Int. Cl.
| | | |
|---|---|---|
| *G06F 16/185* | (2019.01) | |
| *G06F 16/13* | (2019.01) | |
| *G06F 7/16* | (2006.01) | |
| *G06F 16/22* | (2019.01) | |
| *G06F 3/06* | (2006.01) | |
| *G06F 16/17* | (2019.01) | |

(52) U.S. Cl.
CPC .............. *G06F 16/13* (2019.01); *G06F 3/061* (2013.01); *G06F 3/0643* (2013.01); *G06F 3/0671* (2013.01); *G06F 7/16* (2013.01); *G06F 16/1727* (2019.01); *G06F 16/185* (2019.01); *G06F 16/2246* (2019.01)

(58) Field of Classification Search
CPC ............................ G06F 16/2246; G06F 3/0656
See application file for complete search history.

(56) References Cited

U.S. PATENT DOCUMENTS

| | | | | |
|---|---|---|---|---|
| 5,230,047 A | * | 7/1993 | Frey, Jr. ................. | G06F 16/13 714/4.1 |
| 5,813,000 A | * | 9/1998 | Furlani ................ | G11B 27/034 |
| 6,141,655 A | * | 10/2000 | Johnson ................ | G06F 16/283 |
| 6,591,269 B1 | * | 7/2003 | Ponnekanti ......... | G06F 16/2246 |
| 7,697,518 B1 | * | 4/2010 | de Wit ................ | G06F 16/9027 370/389 |
| 8,909,677 B1 | * | 12/2014 | Aguilera ............. | G06F 16/2246 707/797 |
| 2005/0234951 A1 | * | 10/2005 | MacCormick .......... | G06F 16/13 |

(Continued)

OTHER PUBLICATIONS

Jin et al., Lazy-split B+-tree: a novel B+-tree index scheme for flash-based database systems, Des Autom Embed Syst (2013) 17: 167-191. (Year: 2013).*

(Continued)

*Primary Examiner* — Cheyne D Ly

(57) ABSTRACT

A $B^\varepsilon$-tree associated with a file system on a storage volume includes a hierarchy of nodes. Each node includes a buffer portion that can be characterized by a fixed maximum allowable size to store key-value pairs as messages in the buffer. Messages can be initially buffered in the root node of the $B^\varepsilon$-tree, and flushed to descendent children from the root node. Messages stored in the buffers can be indexed using a $B^+$-tree data structure. As the $B^+$-tree data structure in a buffer grows (due to receiving flushed messages) and shrinks (due to messages being flushed), disk blocks can be allocated from the storage volume to increase the actual size of the buffer and deallocated from the buffer to reduce the actual size of the buffer.

17 Claims, 9 Drawing Sheets

(56) References Cited

U.S. PATENT DOCUMENTS

2008/0114787 A1* 5/2008 Kashiyama ............. G06F 16/22
2009/0276430 A1* 11/2009 Bruso ................. G06F 16/2343
2010/0306222 A1* 12/2010 Freedman ........... G06F 16/9014
                                                                                    707/759

OTHER PUBLICATIONS

Michael A. Bender et al., "An Introduction to B" -trees and Write-Optimization", Oct. 2015, 8 pages.

* cited by examiner

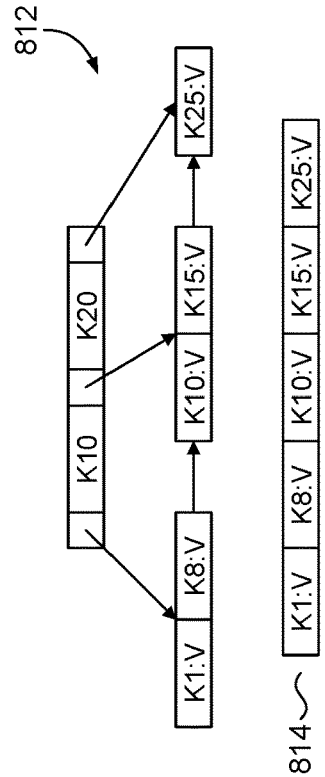
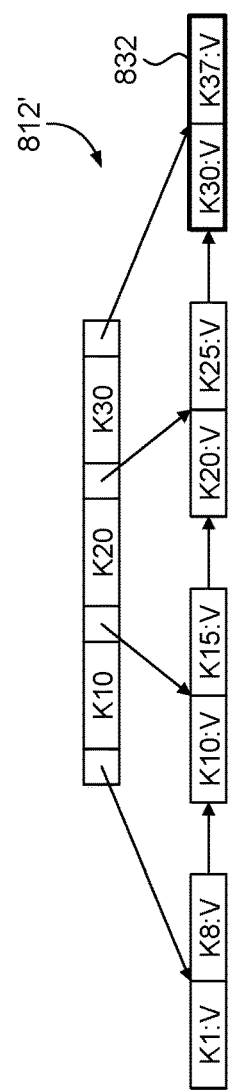
FIG. 8A
FIG. 8B
FIG. 8C
FIG. 8D
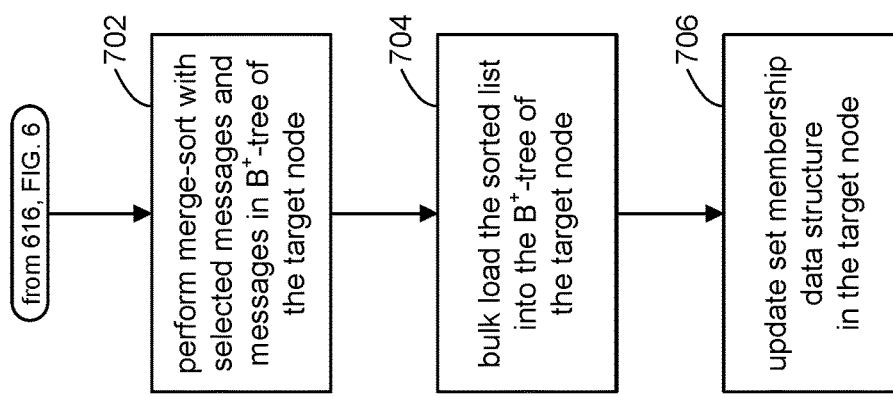
FIG. 7

WRITE-OPTIMIZED NESTED TREES

CROSS REFERENCE TO RELATED APPLICATION

This application is related to commonly owned and concurrently filed U.S. application Ser. No. 15/717,704, filed Sep. 27, 2017, entitled "Auto-Tuned Write-Optimized Key-Value Store," the content of which is incorporated herein by reference in its entirety for all purposes.

BACKGROUND

A $B^\varepsilon$-tree is an example of a write-optimized data structure and can be used to organize on-disk storage in general, and can be suitable in applications such as databases and file systems. The database or file system can comprise a key-value store that allows users to store and retrieve data in the form of key-value pairs. The "key" in a key-value pair can be an index (e.g., number, string, etc.) that uniquely identifies its paired "value." The value in a key-value pair can be any type of data object or collection of data objects. A $B^\varepsilon$-tree can provide a key-value application programming interface (API) to provide insert, range query, and key-value update operations on the key-value store.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 7 and 8A, 8B, 8C, and 8D illustrate rebuilding a $B^+$-tree in accordance with the present disclosure.

DETAILED DESCRIPTION

Disclosed embodiments relate to the use of a variant of the $B^+$-tree data structure (referred to herein as a $B^+$-tree) in the buffer portions of a $B^\varepsilon$-tree index in a file system. The use of a $B^+$-tree data structure can provide efficient space utilization. Space (e.g., disk blocks) can be allocated from the storage volume only as needed to grow the tree. Accordingly, space for the buffer portions in the nodes of a $B^\varepsilon$-tree in accordance with the present disclosure do not have to be fully pre-allocated, as would conventional $B^\varepsilon$-trees. This can simplify free space management and improve performance in the computer system when the buffers are only partially full because fragmentation resulting in a sparse $B^+$-tree can be avoided thus reducing storage volume I/O.

Disclosed embodiments further relate to allowing the node size of the $B^\varepsilon$-tree to vary. By periodically updating the node size according to the workload on the file system, the size of nodes in the $B^\varepsilon$-tree can be tuned for write operations or for read operations. This can improve performance in the computer system because the node size can be tuned according to the nature of the workload as the workload fluctuates between being write-heavy and read-heavy.

The embodiments disclosed herein use a file system as an illustrative use case for $B^\varepsilon$-trees. Persons having ordinary skill in the arts will appreciate that $B^\varepsilon$-trees in accordance with the present disclosure can generally be employed for tasks involving on-disk storage, other than in a file system. For example, $B^\varepsilon$-trees in accordance with the present disclosure can be employed for database storage.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
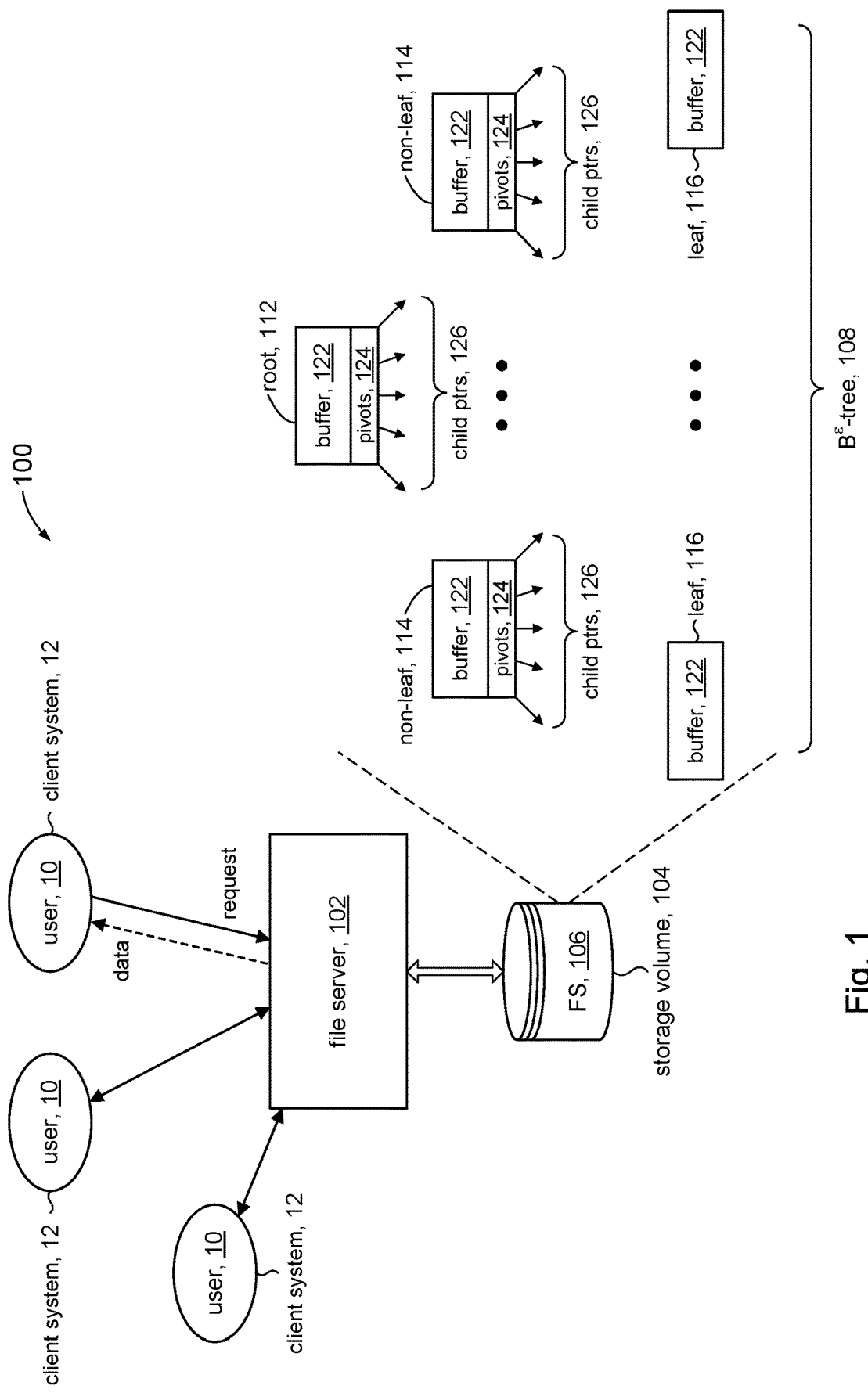
FIG. 1 shows a high level system diagram that uses a file system in accordance with the present disclosure.

FIG. 1 shows a simplified diagrammatic illustration of a system 100 in accordance with some embodiments of the present disclosure. The system 100 can include a file server 102. The file server 102 can service requests from client systems 12 to provide file services for users 10.

The system 100 can include a storage volume 104 that is in communication with and accessed by the file server 102. The storage volume 104 can be any type or form of storage device or medium capable of storing data and/or computer-readable instructions. In some embodiments, storage volume 104 can comprise any suitable block-based storage media. For example, the storage volume 104 can comprise a system of magnetic disk drives (e.g., hard drives), solid state drives, floppy disk drives, magnetic tape drives, optical disk drives, flash drives, and the like.

A file system 106 can be defined on the storage volume 104. Although not shown, persons of ordinary skill will understand that data comprising the files in file system 106 can be stored in the storage volume 104 in units of storage referred to as inodes, which comprise one or disk blocks of storage. A directory can be considered a special kind of file, and its data likewise can be stored in one or more inodes. The file system 1106 can include a file system directory, which represents a logical representation and arrangement of the directories and files that comprise file system 106.

In accordance with the present disclosure, the file system 106 can be associated with a $B^\varepsilon$-tree data structure 108 to organize and manage the file system directory in units called key-value pairs. The key component of a key-value pair can correspond to a directory or file in the file system 106 (e.g., its full pathname). The value component of the key-value pair can represent the content in an inode of the directory or file.

Figure 2:
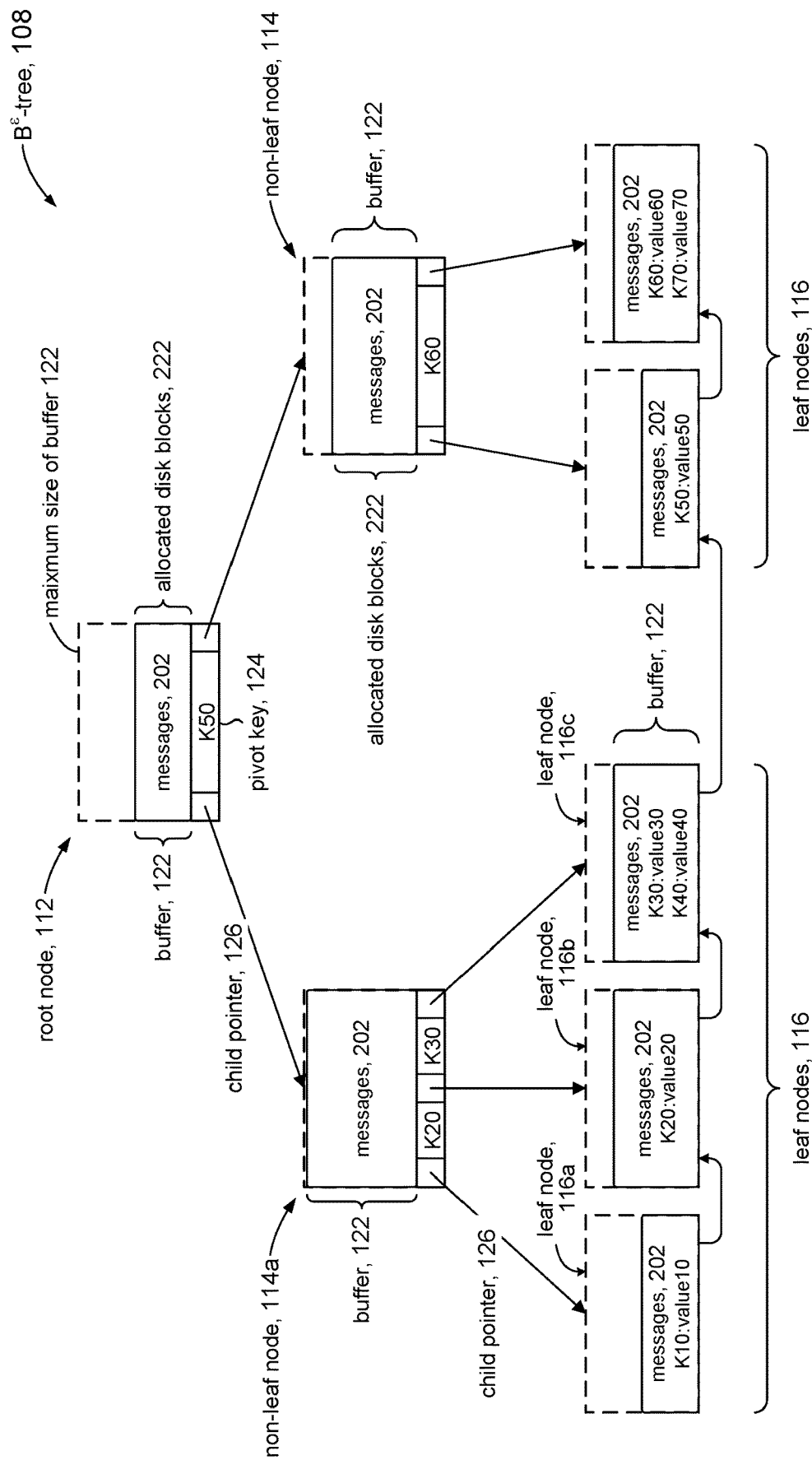
FIG. 2 illustrates an example of a $B^\varepsilon$-tree in accordance with the present disclosure.

Referring to FIGS. 1 and 2, a $B^\varepsilon$-tree 108 in accordance with the present disclosure can comprise a hierarchy of nodes including a root node 112, non-leaf (intermediate) nodes 114, and leaf nodes 116. Space for nodes 112, 114, 116 can be allocated from the storage volume 104 in units of disk blocks. In some embodiments, the nodes 112, 114, 116 can have a predetermined fixed size B. In some instances, for example, the node size B can be a multiple of the underlying block size on storage volume 104 (e.g., hundreds of KB to several MB).

In some embodiments, each node 112, 114, 116 can include a buffer 122. The root node 112 and non-leaf nodes 114 can further include space for pivot keys 124 and child pointers 126. The pivots 124 can comprise only the "key" portions of the key-value pairs, while the key-value pairs themselves are stored in the buffers 122. Leaf nodes 116 have no children and so do not have a pivot space or child pointers, but rather comprise only a buffer 122. In some embodiments, each leaf node 116 in $B^\varepsilon$-tree 108 can include a pointer to the next leaf node to form a linked list of leaf nodes to facilitate rapid in-order traversal.

The $B^\varepsilon$-tree 108 is similar to a conventional $B^+$-tree in some respects. For example, the root node 112 and the non-leaf nodes 114 comprise pivot keys 124 to direct traversal through the tree, and child pointers 126 that point to child nodes. Insertion operations on $B^\varepsilon$-tree 108 are based on insertion algorithms for $B^+$-trees. The $B^\varepsilon$-tree 108 illustrated in FIG. 2 is an example of a $B^\varepsilon$-tree having a branching parameter where each non-leaf node 114 has a minimum of two keys and a maximum of three keys. The figure shows the $B^\varepsilon$-tree after insertion of the following key-value pairs:

K10, value10; K20, value20; K30, value30; K40, value40
K50, value50; K60, value60; K70, value70 using the keys as tree indices, with the assumption that: K10<K20<K30<K40<K50<K60<K70.

The buffer 122 can be used to store messages 202 comprising key-value pairs and operations (e.g., insert, delete) that will be applied at the leaf nodes 116. The size of the buffer 122 can be expressed in terms of the node size B as $(B-B^\varepsilon)$, where $B^\varepsilon$ expresses the amount of space for the pivot keys 124 and child pointers 126 and ε (epsilon) is a tuning parameter, between 0 and 1 (exclusive), that specifies the allocation of the node space between buffer 122 and pivot/child pointers 124, 126. It will be appreciated that $B^\varepsilon$ and $(B-B^\varepsilon)$ are approximations since ε is a fractional exponent, and that actual values can be rounded to the nearest integer multiples of the block size of storage volume 104.

Insertion into the $B^\varepsilon$-tree 108 generally proceed as follows: The key-value pair in a received insert operation is stored as a message in the buffer 122 of the root node 112. If the amount of data stored in the buffer 122 does not exceed $(B-B^\varepsilon)$, the operation is deemed complete. When the buffer 122 in the root node 112 becomes full (e.g., the amount of data comprising the stored messages 202 exceeds $B-B^\varepsilon$), a batch of messages 202 can be flushed to a child node of the root node 112, and stored in the buffer 122 of the child node. This may trigger a cascade effect if the buffer 122 in the receiving child node becomes full, where the child node can flush a batch of messages 202 from its buffer 122 to one of its child nodes, and so on down the $B^\varepsilon$-tree 108. Over the course of flushing, messages 202 ultimately reach the leaf nodes 116. When a leaf node 116 becomes full, it splits, just as in a $B^+$-tree. Similar to a $B^+$-tree, when a node 112, 114 has too many children, it splits and the messages 202 in the buffer 122 are distributed between the two new nodes. Additional details are discussed below.

Moving messages 202 down the tree in batches on an as needed basis improves insert performance. By storing newly inserted messages 202 initially in the root node 112, the $B^\varepsilon$-tree 108 can avoid seeking all over the storage volume 104 to put the messages 202 in their target locations. The file server 102 only moves messages 202 down the $B^\varepsilon$-tree 108 when enough messages have accumulated in the buffer 122 of the root node 112, thus averaging the I/O cost of making random updates over a batch of messages.

In accordance with the present disclosure, the actual allocated size of the buffer 122 in a given node 112, 114 can be dynamic. In other words, storage (e.g., disk blocks 222) from storage volume 104 can be allocated to increase the size of the buffer 122 of a node, up to the maximum allowed size $(B-B^\varepsilon)$ of the buffer 122 on an as needed basis to store messages 202 (e.g., to store a batch of messages from a flush operation). Conversely, storage that was previously allocated to the buffer 122 of a node can be deallocated if the storage becomes unused (e.g., due to flushing a batch of messages). The actual size of a buffer 122 in the $B^\varepsilon$-tree 108 can vary independently of the other buffers 122 in the tree. By making the size of buffer 122 dynamic, space fragmentation leading to a sparse $B^\varepsilon$-tree 108 can be alleviated.

The buffer 122 in the root node 112 is likely to be the most active in terms of being filled and flushed, since the file system 102 processes insert operations start by first inserting messages 202 into the buffer 122 of the root node 112. Accordingly, in some embodiments, the actual size of buffer 122 in the root node 112 can be static; e.g., the buffer 122 can be pre-allocated ahead of time to the maximum buffer size of $(B-B^\varepsilon)$ to avoid excessive I/O that can result from allocating and de-allocating space for the root buffer.

Figure 3A:
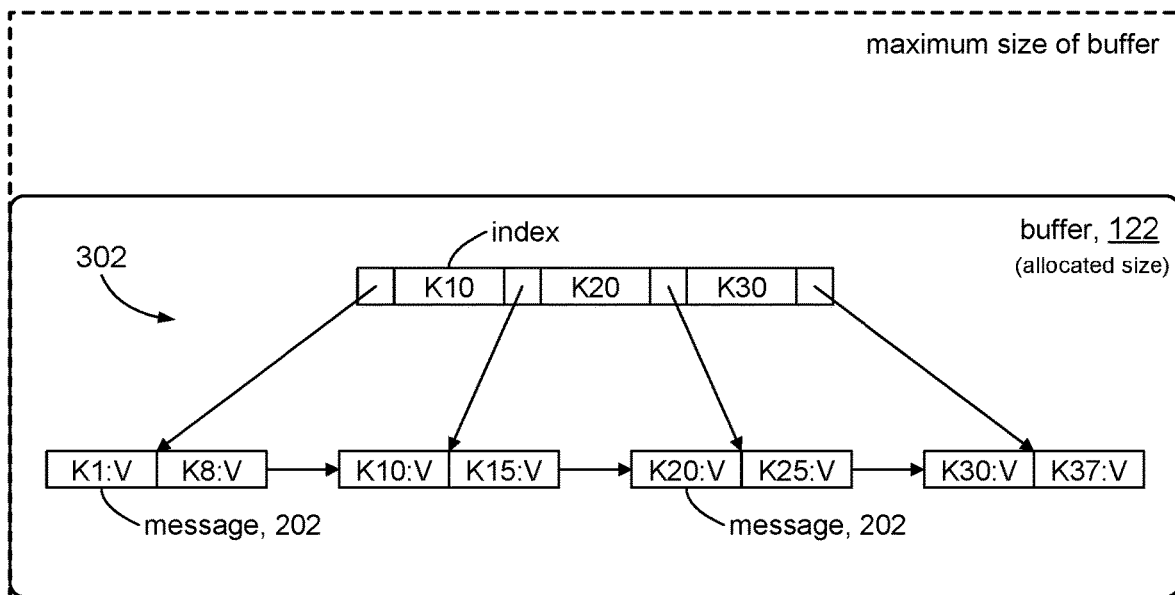
FIGS. 3A and 3B illustrate examples of buffers in accordance with the present disclosure.

Referring to FIG. 3A, in accordance with some embodiments of the present disclosure, the messages 202 in each buffer 122 can be sorted using a $B^+$-tree data structure 302. The messages 202 can be indexed using the keys in the key-value pairs that comprise the messages 202. This aspect of the present disclosure will be discussed in further detail below. FIG. 3A further illustrates that the actual size of buffer 122 can be smaller than its predetermined maximum allowed size of $(B-B^\varepsilon)$. The $B^+$-tree data structure shown in the figure includes chain pointers between adjacent leaf nodes. In some embodiments, a variant of the $B^+$-tree data structure can be used that omits the chain pointers.

Figure 3B:
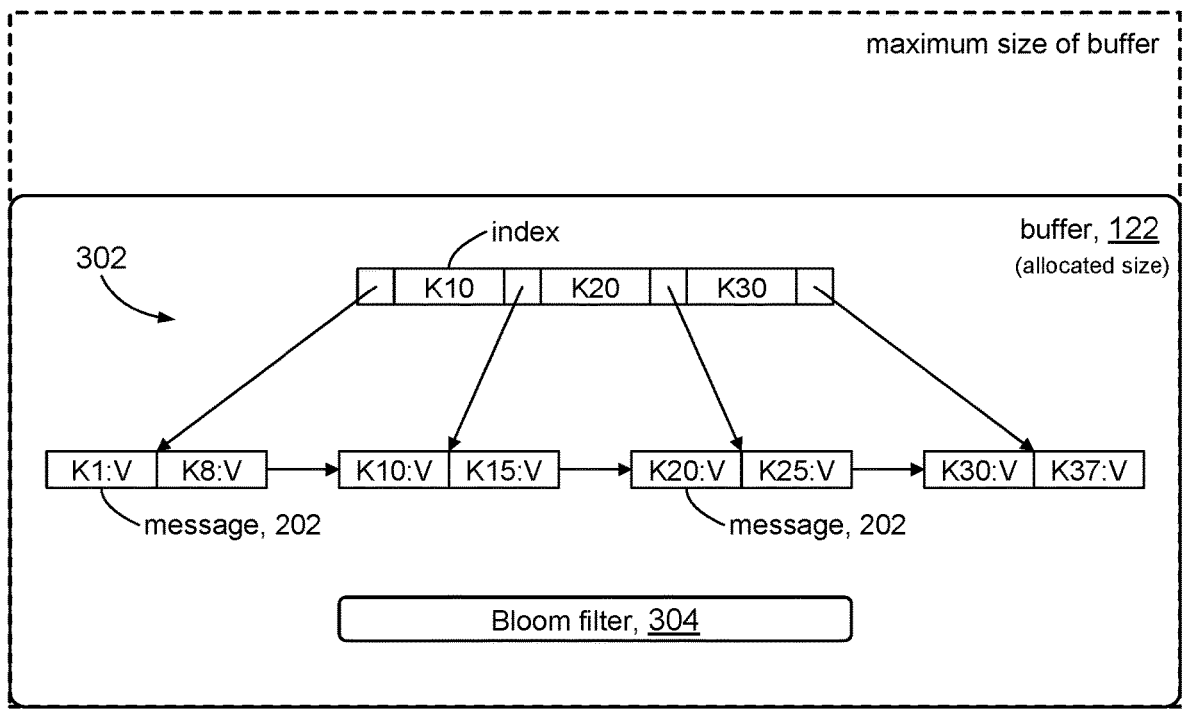

FIG. 3B shows in some embodiments in accordance with the present disclosure, the buffer 122 can include a set membership data structure 304 to facilitate determining whether a key-value pair is indexed in the $B^+$-tree 302. In some embodiments, for example, the set membership data structure 304 can be a Bloom filter, which is a well understood data structure. The Bloom filter comprises an array of bits that are initially CLEARED. The Bloom filter has a set of hash functions. Each hash function is applied to the key component of a key-value pair that is indexed in the $B^+$-tree 302 to produce a set of corresponding hash values. The hash values can be used to identify corresponding bits in the bit array, which are then SET. This process is done for each key-value pair that is indexed in the $B^+$-tree 302. A Bloom filter 304 can provide a true negative determination that a key-value pair is not in the $B^+$-tree 302, and thus can improve performance by avoiding costly traversals in those instances when a key-value pair is not indexed in the $B^+$-tree 302 in a given buffer 122.

Figure 4:
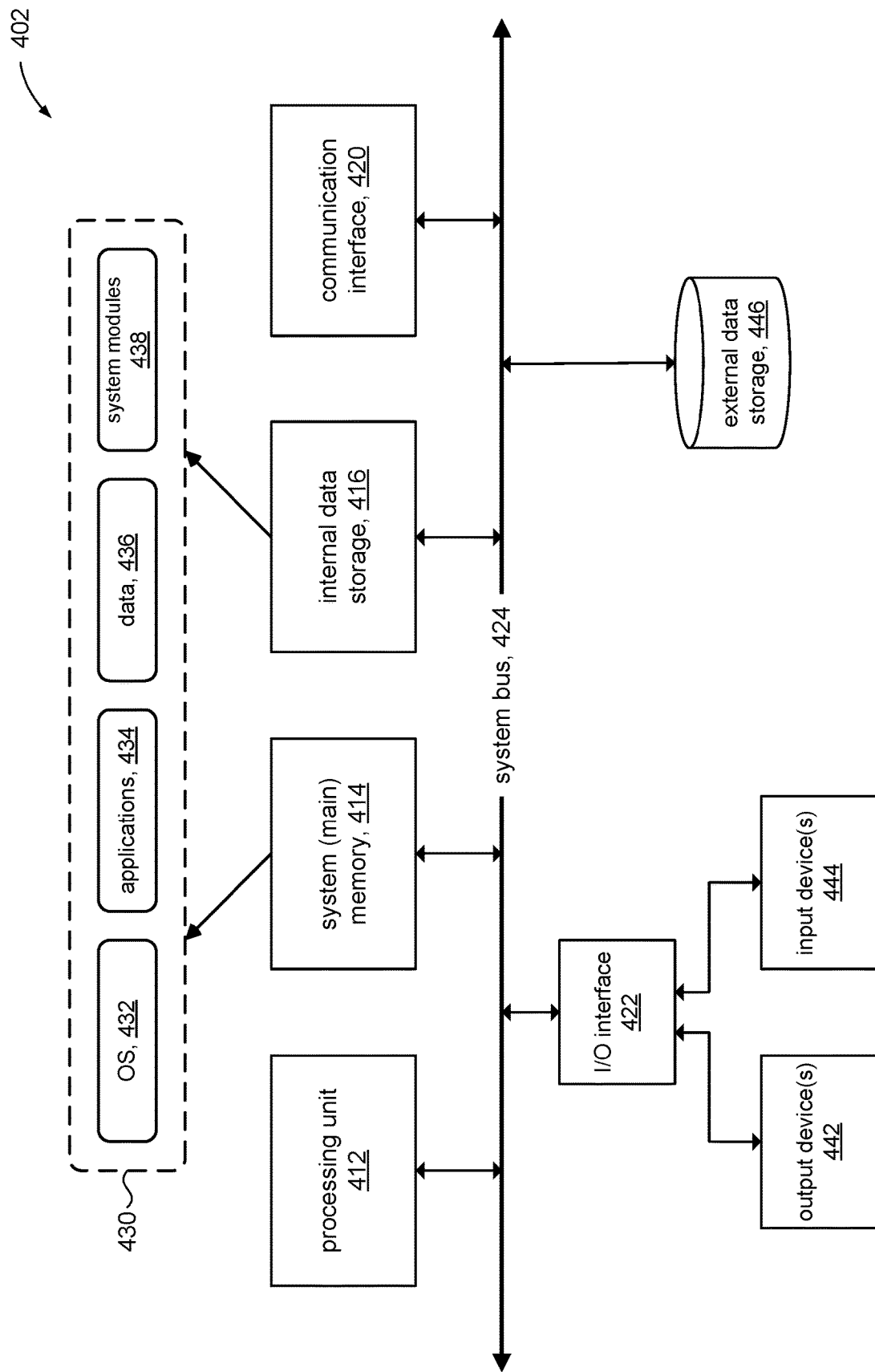
FIG. 4 illustrates a computer system configured in accordance with the present disclosure.

FIG. 4 is a simplified block diagram of an illustrative computing system 402 for implementing one or more of the embodiments described herein. For example, the computing system 402 can perform and/or be a means for performing, either alone or in combination with other elements, operations of file server 102 in accordance with the present disclosure. Computing system 402 can also perform and/or be a means for performing any other steps, methods, or processes described herein.

Computing system 402 can include any single or multi-processor computing device or system capable of executing computer-readable instructions. In a basic configuration, computing system 402 can include at least one processing unit 412 and a system (main) memory 414.

Processing unit 412 can comprise any type or form of processing logic capable of processing data or interpreting and executing instructions. The processing unit 412 can be a single processor configuration in some embodiments, and in other embodiments can be a multi-processor architecture comprising one or more computer processors. In some embodiments, processing unit 412 may receive instructions from program and data modules 430. These instructions can cause processing unit 412 to perform operations and processing in accordance with the present disclosure.

System memory 414 (sometimes referred to as main memory) can be any type or form of volatile or non-volatile storage device or medium capable of storing data and/or other computer-readable instructions. Examples of system memory 414 include, for example, random access memory (RAM), read only memory (ROM), flash memory, or any other suitable memory device. Although not required, in some embodiments computing system 402 may include both a volatile memory unit (such as, for example, system memory 414) and a non-volatile storage device (e.g., data storage 416, 446).

In some embodiments, computing system 402 may also include one or more components or elements in addition to processing unit 412 and system memory 414. For example, as illustrated in FIG. 4, computing system 402 may include internal data storage 416, a communication interface 420, and an I/O interface 422 interconnected via a system bus 424. System bus 424 can include any type or form of infrastructure capable of facilitating communication between one or more components comprising computing system 402. Examples of system bus 424 include, for example, a communication bus (such as an ISA, PCI, PCIe, or similar bus), and a network.

Internal data storage 416 may comprise non-transitory computer-readable storage media to provide nonvolatile storage of data, data structures, computer-executable instructions, and so forth to operate computing system 402 in accordance with the present disclosure. For instance, the internal data storage 416 may store various program and data modules 418, including for example, operating system 432, one or more application programs 434, program data 436, and other program/system modules 438.

Communication interface 420 can include any type or form of communication device or adapter capable of facilitating communication between computing system 402 and one or more additional devices. For example, in some embodiments communication interface 420 may facilitate communication between computing system 402 and client systems 12 to provide file services for users 10. Examples of communication interface 420 include, for example, a wired network interface (such as a network interface card), a wireless network interface (such as a wireless network interface card), a modem, and any other suitable interface.

In some embodiments, communication interface 420 may also represent a host adapter configured to facilitate communication between computing system 402 and one or more additional network or storage devices, such as storage volume 104, via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 402 may also include at least one output device 442 (e.g., a display) coupled to system bus 424 via I/O interface 422, for example, to facilitate I/O with a system administrator. The output device 442 can include any type or form of device capable of visual and/or audio presentation of information received from I/O interface 422.

Computing system 402 may also include at least one input device 444 coupled to system bus 424 via I/O interface 422, for example, to facilitate I/O with a system administrator. Input device 444 can include any type or form of input device capable of providing input, either computer or human generated, to computing system 402. Examples of input device 444 include, for example, a keyboard, a pointing device, a speech recognition device, or any other input device.

Figure 5:
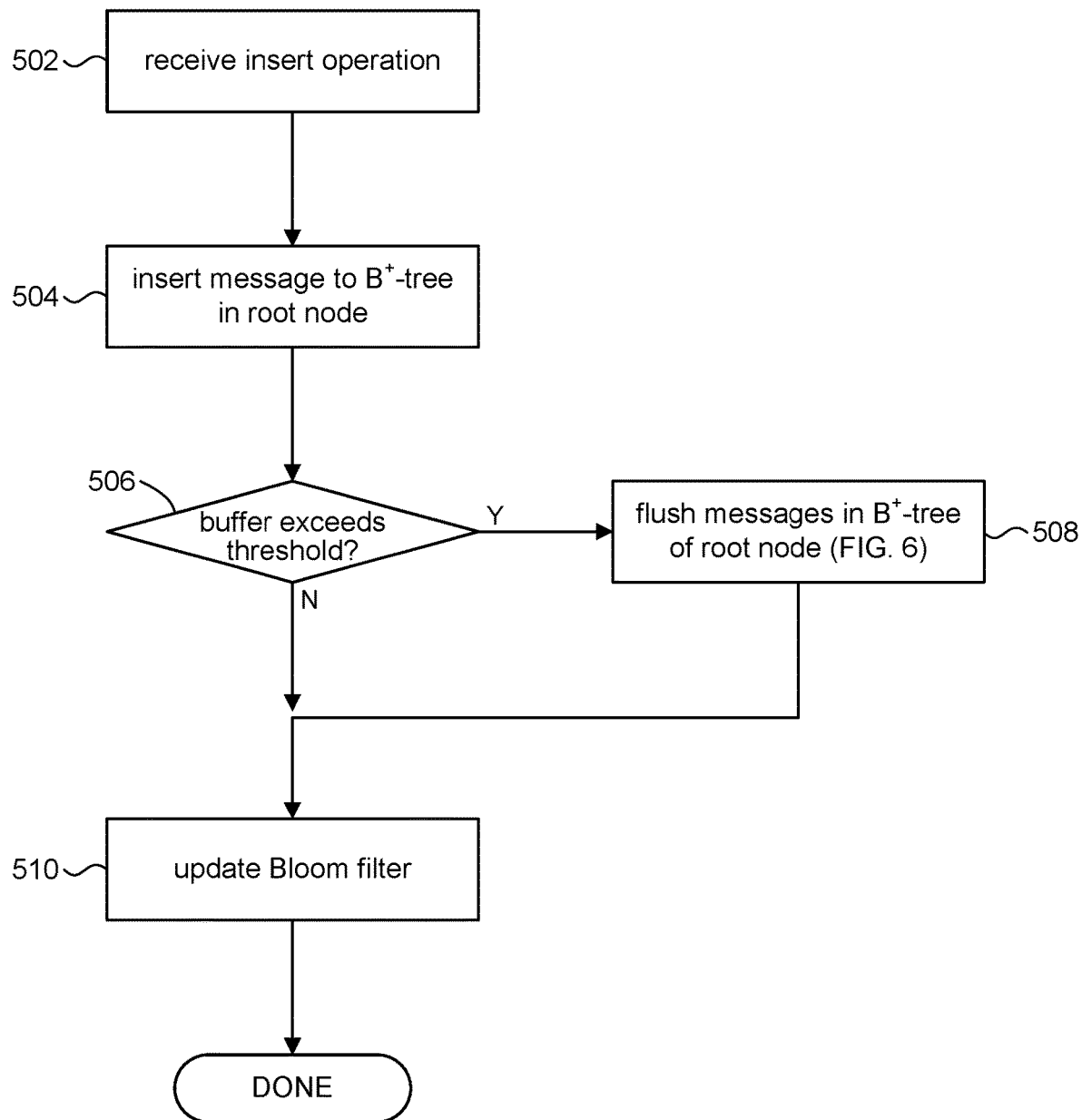
FIG. 5 illustrates processing an insert operation in accordance with the present disclosure.

Referring to FIG. 5 and other figures, the discussion will now turn to a high level description of operations and processing by the file server 102 to process insert operations in accordance with embodiments of the present disclosure. In some embodiments, for example, the file server 102 can include computer executable program code, which when executed by its processor (e.g., 412, FIG. 4), can cause the file server 102 to perform processing in accordance with FIG. 5. The operation and processing blocks described below are not necessarily executed in the order shown, and can be allocated for execution among one ore more concurrently executing processes and/or threads.

At block 502, the file server 102 can receive an insert operation, for example, via a suitable API call, to insert a message into the $B^\epsilon$-tree 108. The message can comprise a key-value pair contained in the insert operation and an INSERT token that represents the operation. The key component in the key-value pair part of the message, for example, can be an identifier of a file or directory in the file system 106. The value component in the key-value pair can be an inode number of an inode that comprises the file or directory.

At block 504, the file server 102 can add the key-value pair to the $B^+$-tree (e.g., 302) in buffer 122 of the root node 112 of $B^\epsilon$-tree 108. In some embodiments, for example, the insert operation can be encoded as an insert message comprising the key-value pair that is added to the $B^+$-tree using the key component as an index into the tree. Insertion of the message into the $B^+$-tree can proceed in accordance with known $B^+$-tree insertion algorithms. In accordance with the present disclosure, the buffer 122 can be updated with the received key-value pair before checking if the maximum size of the buffer 122 is reached, since its $B^+$-tree can grow dynamically. This has the benefit of reducing update latencies.

At block 506, the file server 102 can make a determination whether the amount of data in the buffer 122 of the root node 112 of $B^\epsilon$-tree 108 has exceeded a threshold value. In some embodiments, for example, the threshold value can be computed as $(B-B^\epsilon)$. In response to a determination that the buffer 122 is full (e.g., exceeds the threshold value), processing can proceed to block 508. In response to a determination that the buffer 122 is not full, processing can proceed to block 510.

At block 508, the file server 102 can flush previously stored messages from the buffer 122 of the root node 112 to a child node to open up space in the buffer 122. This aspect of the present disclosure is discussed in more detail in FIG. 6. Processing can proceed to block 510. An advantage of the present disclosure is that the update can occur prior to the flushing operation, thus improving update latency, because the buffer 122 is allowed to dynamically grow.

At block 510, the file server 102 can update the Bloom filter 304, or other set membership data structure, to indicate that the received key-value pair is now a member of the set of key-value pairs in the B$^+$-tree. In some embodiments, for the example, the key component of the key-value pair can be used in the hash functions of the Bloom filter 304 to set bits in the bit array of the Bloom filter. Processing of the insert operation can be deemed to be complete.

Figure 6:
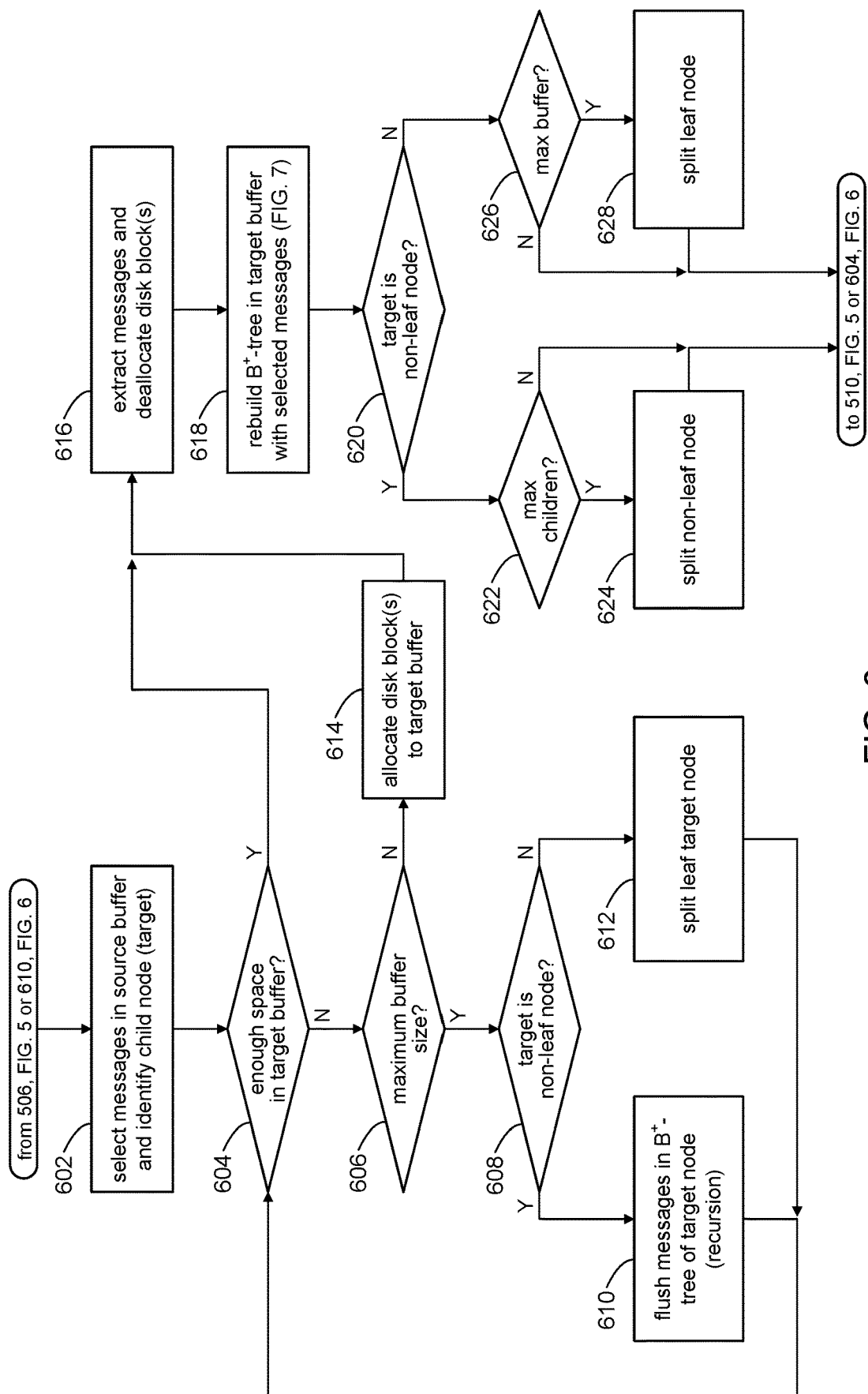
FIG. 6 illustrates buffer flushing in accordance with the present disclosure.

Referring to FIG. 6 and other figures, the discussion will now turn to a high level description of operations and processing by the file server 102 to flush messages in the buffer of a source node to a child (target) of the source node in accordance with embodiments of the present disclosure. In some embodiments, for example, the file server 102 can include computer executable program code, which when executed by its processor (e.g., 412, FIG. 4), can cause the file server 102 to perform processing in accordance with FIG. 6. The operation and processing blocks described below are not necessarily executed in the order shown, and can be allocated for execution among one ore more concurrently executing processes and/or threads.

Processing in FIG. 6 can be initiated from block 506 (FIG. 5) in response to a determination that the buffer 122 in the root node of B$^\varepsilon$-tree 108 is full. Processing in FIG. 6 can also be initiated from block 610 (e.g., via a recursive call), explained below.

At block 602, the file server 102 can select messages 202 in the source buffer of the ource node to flush. Consider node 114a in the B$^\varepsilon$-tree 108 shown in FIG. 2 as being the source node, for example. Messages 202 stored in the buffer 122 (source buffer) of node 114a belong to the children nodes (leaf nodes or non-leaf nodes) pointed to by the child pointers 126; in the example shown in FIG. 2, the children nodes are leaf nodes 116a, 116b, 116c. The key components of the key-value pairs that comprise messages 202 in node 114a identify the children nodes that they belong to. For example, messages 202 whose key components are <K20 belong to node 116a. Likewise, messages 202 whose key components are ≥K20 and <K30 belong to node 116b, and messages 202 whose key components are ≥K30 belong to node 116c.

In some embodiments, the messages in the source node that are selected to be flushed can be based on the number of messages that belong to a child node. For example, the largest set of messages that belong to a child node can be selected for the flush operation, and that child node becomes the target node of the flush operation. In other embodiments, each child node can be selected as the target node in round robin fashion. In some embodiments, a child node can be randomly selected as the target node. In still other embodiments, all the children nodes can be selected target nodes, and so on. It is noted that not all the messages that belong to the target node need to be flushed in a single flush operation.

At block 604, the file server 102 can make a determination whether there is enough space in the disk blocks currently allocated to the buffer (target buffer) of the target node to store the selected messages without having to allocate additional disk blocks. In other words, can the current actual size of the target buffer store the selected messages? In response to a determination that there are enough disk blocks allocated to the target buffer to store the selected messages, processing can proceed to block 616. In response to a determination that there are not enough disk blocks allocated to the target buffer to store the selected messages, processing can proceed to block 606 to allocate additional disk blocks to the target buffer.

At block 606, the file server 102 can make a determination whether allocating additional disk blocks to store the selected messages would exceed the predetermined maximum allowed buffer size (B−B$^\varepsilon$) for the target buffer. In response to a determination that allocating disk blocks to the target buffer would not exceed the predetermined maximum allowed buffer size, processing can proceed to block 614. In response to a determination that allocating disk blocks to the target buffer would exceed the predetermined maximum allowed buffer size, processing can proceed to block 608 to reduce the actual size of the target buffer.

At block 608, the file server 102 has determined that no more disk blocks can be allocated to the target buffer without the target buffer exceeding the predetermined maximum allowed buffer size (B−B$^\varepsilon$). If the target buffer is in a non-leaf node, then processing can proceed to block 610 to reduce the size of the target buffer by flushing some of the messages in the target buffer. If the target buffer is in a leaf node, the processing can proceed to block 612 to split the leaf node, and in the process reduce the size of the target buffer to store the selected messages.

At block 610, the file server 102 can make room in the target buffer of a non-leaf node by repeating the process of FIG. 6 (e.g., in a recursive manner) and flushing messages in the target buffer, treating the target node as a source node. It can be appreciated that a cascading effect can be triggered in which messages are flushed down the B$^\varepsilon$-tree 108 to descendant child nodes. When processing in block 610 completes, processing can return to block 604 to determine whether flushing the messages has created enough space in the target buffer.

At block 612, the file server 102 can make room in the target buffer of a leaf node by splitting the leaf node. In some embodiments, for example, the file server can allocate a new leaf node and distribute the messages in the buffer of the original leaf node between the original leaf node and the newly allocated node. Then, depending on which leaf node the selected messages belong to, either the original leaf node remains the target node or the new leaf becomes the target node. When processing in block 612 completes, processing can continue with blocks 604 and 606 to determine whether splitting the leaf node has created enough space in the buffer of the target node.

At block 614, the file server 102 has determined in block 606 that one or more disk blocks can be allocated to the target buffer to store the selected messages. In response, the file server 102 can allocate a disk block(s) to the target buffer, thus increasing its actual size.

At block 616, the file server 102 can extract the selected messages from the source buffer. In some embodiments, for example, the file server 102 can delete the selected messages from the B$^+$-tree of the source buffer. In addition, the set membership data structure 304 (e.g., Bloom filter) in the source buffer can be updated to indicate that the selected messages are no longer indexed in the B$^+$-tree of the source buffer. Furthermore, in accordance with some embodiments of the present disclosure, any disk blocks that become unused as a result of deleting the selected messages from the B$^+$-tree can be deallocated from the source buffer to avoid creating holes in the tree structure.

At block 618, the file server 102 can store the selected messages in the target buffer. In some embodiments, the file server 102 can rebuild the B+-tree in the target buffer rather than inserting messages using the B+-tree's insert API, and thus avoid creating holes in the B+-tree. This process is discussed in more detail in connection with FIG. 7. At this point, flushing of the selected messages can be deemed complete.

In some embodiments, the file server 102 may perform preemptive splitting of a node to improve the performance of subsequent insert operations. Thus, at block 622 when the target node is a non-leaf node (block 620) and contains the maximum number of child pointers, the file server 102 can split the non-leaf node (block 624). In some embodiments, the threshold may be other than the maximum number of children pointers. For example, the threshold for preemptively splitting a non-leaf node can be a percentage (e.g., 90%) of the maximum.

Likewise, at block 626 when the target node is a leaf node and its buffer is at the maximum allowed size of (B−B$^\varepsilon$), the file server 102 can split the leaf node (block 628). In some embodiments, the threshold may be other than the buffer's maximum capacity. For example, the threshold for preemptively splitting a leaf node can be a percentage (e.g., 90%) of the maximum capacity.

The file server 102 can continue with block 510 (FIG. 5) to continue processing a received insert operation. In the case of a recursive invocation of this process, the file server 102 can continue with block 604.

Referring to FIGS. 7 and 8A-8D, and other figures, the discussion will now turn to a high level description of operations and processing by the file server 102 to rebuild the B+-tree in a buffer 122 in accordance with embodiments of the present disclosure. In some embodiments, for example, the file server 102 can include computer executable program code, which when executed by its processor (e.g., 412, FIG. 4), can cause the file server 102 to perform processing in accordance with FIG. 7. The operation and processing blocks described below are not necessarily executed in the order shown, and can be allocated for execution among one ore more concurrently executing processes and/or threads.

Processing in FIG. 7 can be initiated from block 616 (FIG. 6) to rebuild the B+-tree in the target node. FIGS. 8A-8D provide an illustrative example.

At block 702, the file server 102 can merge the selected messages identified in the source buffer with the messages in the target buffer. FIG. 8A represents a list of 802 messages selected from the buffer of a source node. FIG. 8B represents the B+-tree 812 in a target node. FIG. 8B shows a list 814 of messages that are indexed by the B+-tree tree 812. In accordance with some embodiments of the present disclosure, for example, the file server 102 can merge the lists 802, 814 using, for example, known sorting techniques such as merge sort, heapsort, quicksort, and the like. FIG. 8C represents a sorted list 822 comprising a sorted combination of lists 802, 814. In some embodiments, the sorting operation can be a merge sort.

At block 704, the file server 102 can rebuild the B+-tree 812 of the target node. In some embodiments, for example, the B+-tree 812 can be bulk-loaded from the sorted list 822. FIG. 8D illustrates an example of a B+-tree 812' rebuilt from the sorted list 822. The file server 102 can build the B+-tree 812' using disk blocks that have already been allocated to the original B+-tree 812, and allocating additional data blocks (e.g., 832) as needed to provide storage for the additional messages.

In accordance with the present disclosure, the file server 102 can build the B+-tree 812' from the bottom up in left-to-right order by allocating messages in the sorted list 822 into leaf nodes and creating non-leaf nodes as needed. The file server 102 can fill each leaf node so that there are no holes in the leaf nodes of the rebuilt B+-tree 812'. In this way, every leaf node, except possibly the last leaf node, is compacted. This compaction avoids a sparse B+-tree in which disk blocks comprising the leaf nodes are only partially filled. The compaction can reduce the number of disk blocks used by the B+-tree thus improving performance in the computer system when doing a search. In some embodiments, the file server 102 can leave some amount of unused space in each leaf node to allow for future inserts, which may reduce the number (and associated I/O cost) of potential split operations of leaf nodes.

At block 706, the file server 102 can update the set membership data structure (e.g., Bloom filter) to indicate the presence of the newly added messages. Rebuilding of the B+-tree can be deemed to be complete, and the file server 102 can return to processing at block 620 in FIG. 6.

Figure 9:
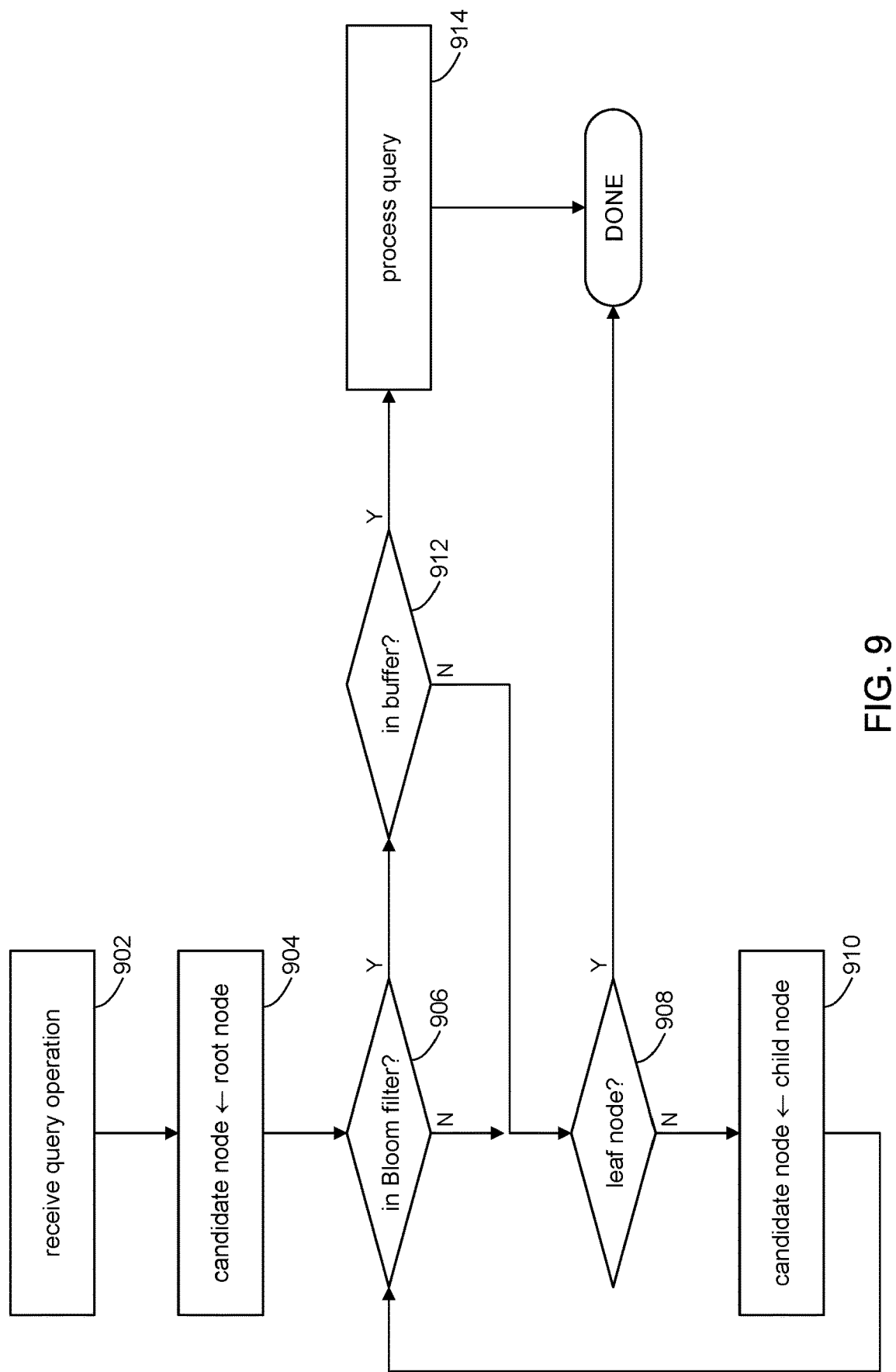
FIG. 9 illustrates processing a query operation in accordance with the present disclosure.

Referring to FIG. 9 and other figures, the discussion will now turn to a high level description of operations and processing by the file server 102 to process a query on a B$^\varepsilon$-tree 108 in accordance with embodiments of the present disclosure. In some embodiments, for example, the file server 102 can include computer executable program code, which when executed by its processor (e.g., 412, FIG. 4), can cause the file server 102 to perform processing in accordance with FIG. 9. The operation and processing blocks described below are not necessarily executed in the order shown, and can be allocated for execution among one ore more concurrently executing processes and/or threads.

At block 902, the file server 102 can receive a query operation, for example, via a suitable API call, to access a corresponding key-value pair (if there is one) indexed in the B$^\varepsilon$-tree 108. The file server 102 can use a query key specified in the query to perform a lookup of the keys indexed in the B$^\varepsilon$-tree 108, beginning with the root node 112 and progressing down the B$^\varepsilon$-tree 108.

At block 904, the file server 102 set a candidate node to point initially to the root node 112 of B$^\varepsilon$-tree 108. The file server 102 can query each candidate node beginning with the root node to identify a target node to service the query operation.

At block 906, the file server 102 can use the set membership data structure (e.g., 304) in the candidate node to determine if the key-value pair identified by the query key is in the B+-tree of the candidate node. In some embodiments, for example, the set membership data structure is a Bloom filter (FIG. 3B). It is known that a Bloom filter can provide a true negative determination that a member (e.g., key-value pair) is indicated as not being in the set (e.g., B+-tree). It is also known that the Bloom filter can provide a false positive determination that the member is in the set. Accordingly, in response to a positive determination, processing can proceed to block 912. In response to a negative determination, processing can proceed to block 908.

At block 908, the file server 102 has determined that the query key does not identify a key-value pair in the B+-tree of the candidate node. If the candidate node is a leaf node, then processing of the query operation can be deemed complete with no results since there are no more children nodes to visit. On the other hand, if the candidate node is a non-leaf node, then a child node is identified and set as the next candidate node (block 910). In some embodiments, for example, the pivot keys can be used to identify the next child (candidate) node to visit. Processing can repeat with block 906 with the next candidate node.

At block 912, the file server 102 has determined that the Bloom filter has produced a positive determination for the query key. Accordingly, the file server 102 can search the B$^+$-tree in the candidate node using the query key to determine if the corresponding key-value pair is in fact indexed in the B$^+$-tree of the candidate node. If not, then processing can proceed to block 908 to identify the next candidate node, if any. If the key-value pair is found, then the file server 102 can process the query operation (block 914) using the key-value pair. Processing of the query operation can be deemed complete.

Figure 10:
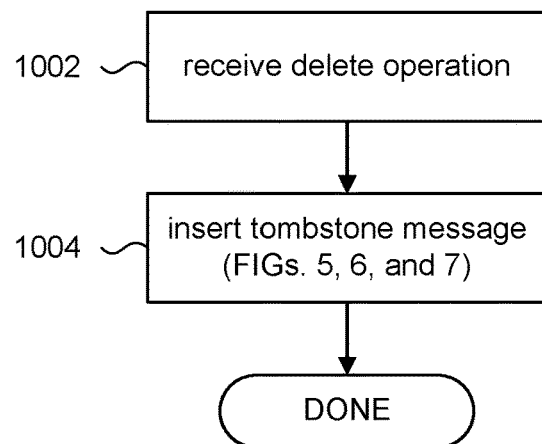
FIG. 10 illustrates processing a delete operation in accordance with the present disclosure.

Referring to FIG. 10 and other figures, the discussion will now turn to a high level description of operations and processing by the file server 102 to process a delete operation on a B$^\varepsilon$-tree 108 in accordance with embodiments of the present disclosure. In some embodiments, for example, the file server 102 can include computer executable program code, which when executed by its processor (e.g., 412, FIG. 4), can cause the file server 102 to perform processing in accordance with FIG. 10. The operation and processing blocks described below are not necessarily executed in the order shown, and can be allocated for execution among one ore more concurrently executing processes and/or threads.

At block 1002, the file server 102 can receive a delete operation, for example, via a suitable API call, to delete a message from the B$^\varepsilon$-tree 108. The delete operation can include a key that identifies the key-value pair in the B$^\varepsilon$-tree 108 to be deleted.

At block 1004, the file server can insert a tombstone message in the B$^+$-tree of the root node, instead of immediately deleting the target message. The tombstone message can comprise the key contained in the received delete operation and a DELETE token. The flow for processing the insertion of the tombstone message can proceed generally according FIGS. 5, 6, and 7.

Tombstone messages can be flushed down the nodes of the B$^\varepsilon$-tree 108 along with other messages. When a tombstone message winds up in the same B$^+$-tree as a key-value pair identified by the tombstone message, that key-value pair can be deleted from the B$^+$-tree. If the B$^+$-tree is in a non-leaf node, the tombstone message is retained. On the other hand, if the B$^+$-tree is in a leaf node, the tombstone message can be deleted from the leaf node. When key-value pairs are deleted from a B$^+$-tree, disk blocks that become unused can be deallocated from the B$^+$-tree. This can be performed, for example, prior to the bulk loading step (block 704) in FIG. 7.

In some embodiments in accordance with the present disclosure, performance may be improved by maintaining approximately half-full B$^+$-trees in the leaf nodes and approximately half-full pivot keys in the non-leaf nodes. Thus, for example, if the pivot keys in a non-leaf node are less than half-full or if the B$^+$-tree in a leaf node is less than half-full, the file server 102 can check the neighbor nodes to see if any of them are more than half-full. If so, then the pivots or B$^+$-trees can be "horizontally" cascaded across the neighbor nodes to spread out the storage utilization among those nodes. Any disk blocks that become unused can be deallocated.

In the foregoing descriptions, the size B of each node in the B$^\varepsilon$-tree 108 is fixed, but the size of the buffer 122 can vary in size up to a predetermined maximum allowed size, namely (B–B$^\varepsilon$) as the B$^+$-tree in the buffer 122 shrinks and grows. The discussion will now turn to some embodiments in which the size B of the nodes themselves can vary; as such, the maximum allowed size that the buffer 122 can grow or shrink over time.

In the embodiments disclosed above, the node size B was assumed to be a predetermined fixed value for the life of the file system; every node in the B$^\varepsilon$-tree 108 would have a fixed size of B and each buffer would have a maximum allowed size of (B–B$^\varepsilon$). In accordance with other embodiments of the present disclosure, the size of the node itself can vary at run time. In some embodiments, for example, an expected node size $B_{exp}$ can be compared to the current (actual) size of a given node; since the number of disk blocks allocated to the buffer 122 component of a node can vary from node to node, the actual size of a node can vary from node to node. If the current actual size of the given node is smaller than $B_{exp}$, then that node can be allowed to grow; i.e., more disk blocks can be allocated to that node's buffer. Conversely, if the current actual size of the given node is larger than $B_{exp}$, then its buffer cannot accept messages. Instead messages in its buffer will be flushed (in the case of a non-leaf node), or the node may have to be split (in the case of a leaf node), to reduce the size of the buffer and hence the size of the node to $B_{exp}$. Moreover, since $B_{exp}$ can vary at run time, the maximum allowed size of any given node in the B$^\varepsilon$-tree 108 can vary over time.

In terms of processing an insert operation shown in FIGS. 5 and 6, the expected node size $B_{exp}$ can be enforced at various points in the process. In block 504 of FIG. 5, for example, the threshold value that is used to determine whether to flush the root buffer can be computed using $B_{exp}$ as ($B_{exp} - B_{exp}^\varepsilon$), instead of (B–B$^\varepsilon$).

In block 604 of FIG. 6, the inquiry whether the current size of the target buffer can store flushed messages can further include making an initial inquiry whether the disk blocks currently allocated to the target buffer is greater or smaller than ($B_{exp} - B_{exp}^\varepsilon$). Since the expected node size $B_{exp}$ can vary from time to time, the current size of the target buffer (and hence the node) may now be too big, and may have to be reduced if the current value of $B_{exp}$ is smaller than the value of $B_{exp}$ at the time the target buffer was last processed. Likewise, at blocks 606 and 626 of FIG. 6, the maximum buffer size can be based on ($B_{exp} - B_{exp}^\varepsilon$), instead of (B–B$^\varepsilon$).

Figure 11:
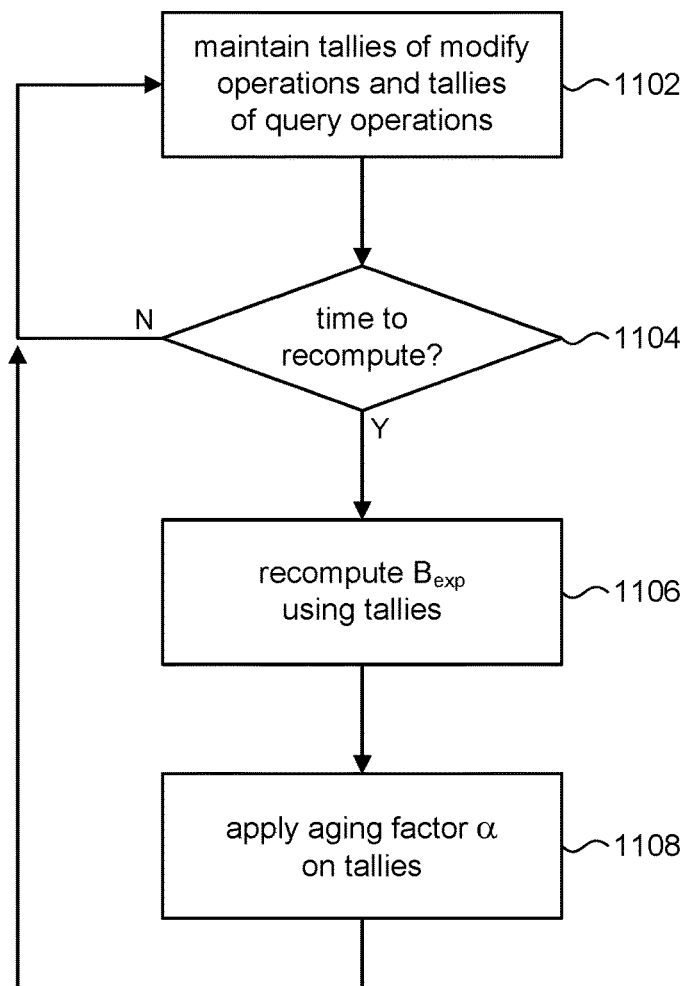
FIG. 11 illustrates processing a dynamic buffer size parameter in accordance with the present disclosure.

Referring to FIG. 11 and other figures, the discussion will now turn to a high level description of operations and processing by the file server 102 to periodically recompute (update) the expected node size $B_{exp}$ in accordance with embodiments of the present disclosure. In some embodiments, for example, the file server 102 can include computer executable program code, which when executed by its processor (e.g., 412, FIG. 4), can cause the file server 102 to perform processing in accordance with FIG. 11. The operation and processing blocks described below are not necessarily executed in the order shown, and can be allocated for execution among one ore more concurrently executing processes and/or threads. The process of FIG. 11 can run as a background process.

At block 1102, the file server 102 can maintain tallies of modify operations and query operations (read operations) that it receives. The modify operations include operations that can modify or otherwise change the B$^\varepsilon$-tree (and in particular its size) such as insert operations, update operations, delete operations, and the like. In some embodiments, the file server 102 can increment a counter $N_i$ for each modify operation that it receives, and another counter $N_q$ for each query operation it receives.

At block 1104, the file server 102 can determine whether it is time to recompute or otherwise update the expected node size $B_{exp}$; for example, by setting a timer or by other suitable timing means. In some embodiments, for example, a timer can be set to alarm at every S seconds. The file server 102 can continue to tally the insert and query operations (block 1102) until the timer expires, at which time the file server 102 can recompute $B_{exp}$ (block 1106).

At block 1106, the file server 102 can recompute $B_{exp}$ based on the count $N_i$ of insert (write) operations and the count $N_q$ of query (read) operations. In some embodiments, the re-computation of $B_{exp}$ can be based on cost functions associated with insert and query operations. Merely as an example, the cost function $C_{modify}$ for modify operations can be expressed as:

$$C_{modify} = \frac{N_i}{N_i + N_q} \times \frac{\log_{B_C}(N_{buffer})}{\varepsilon B_C^{(1-\varepsilon)}},$$

where $B_C$ is a candidate node size that will become the updated value of $B_{exp}$, $\varepsilon$ is a tuning parameter, between 0 and 1, that divides the node between buffer and pivot/child pointers, $N_{buffer}$ is the total number of key-value pairs indexed in the $B^\varepsilon$-tree 108, $N_i$ is the count of modify operations, and $N_q$ is the count of query operations.

An example of the cost function $C_{query}$ for query operations can be expressed as:

$$C_{query} = \frac{N_q}{N_i + N_q} \times \frac{\log_{B_C}(N_{buffer})}{\varepsilon}.$$

A total I/O cost $C_{total}$ metric can be computed by the sum: $(C_{modify} + C_{query})$. The total I/O cost $C_{total}$ metric can be computed for three different values of the candidate node size $B_C$, namely:

$$B_C = B_{exp} - \Delta, \; B_C = B_{exp}, \text{ and } B_C = B_{exp} + \Delta$$

where $\Delta$ is small number used to adjust the node size of $B^\varepsilon$-tree 108. The value of $B_C$ that computes out the lowest total cost $C_{total}$ becomes the recomputed (updated) node size $B_{exp}$. Thus, the updated value of $B_C$ can decrease, remain the same, or increase depending the with candidate node size produced the smallest value for $C_{total}$.

In some embodiments, the file server 102 can use the count $N_i$ of modify operations and the count $N_q$ of query operations tallied since the last re-computation; in other words, $N_i$ and $N_q$ can be reset to zero after each re-computation. In other embodiments, the file server 102 can continuously accumulate $N_i$ and $N_q$ from some initial point in time (e.g., from the time of the last system reboot) with no resetting of $N_i$ and $N_q$.

In still other embodiments, the file server 102 can apply an aging factor on previously accumulated counts of $N_i$ and $N_q$ (block 1108) so that recent tallies are given a higher weight. Consider, for example, the count $N_i$ of modify operations; it will be appreciated that the following applies to $N_q$ as well. Suppose a re-computation is performed at time t1 and the total "aged" count of modify operations as of time t1 is $N_{i1}$. Suppose another re-computation is made at time t2. The aged insert count $N_{i2}$ at time t2 can be computed as $$N_{i2} = \alpha N_{i1} + \Delta_2$$

where $\alpha$ is an aging factor (<1), and $\Delta_2$ is the number of modify operations received between time t1 and time t2.

At time t2, the count $N_{i1}$ is weighted so that its influence is reduced as compared to the number of modify operations $\Delta_2$ tallied between time t1 and time t2. At another time t3, the aged count of modify operations can be computed as $$N_{i3} = \alpha N_{i2} + \Delta_3$$

$$N_{i3} + \alpha(\alpha N_{i1} + \Delta_2) + \Delta_3.$$

At time t2, the count $N_{i2}$ is weighted so that its influence is reduced as compared to the number of modify operations $\Delta_3$ tallied between time t2 and time t3. Note that the count $N_{i1}$ is weighted even less (by a factor $\alpha^2$) at time t3 than at time t2. It will be appreciated that the foregoing is merely illustrative, and the other aging algorithms can be used.

Conventionally, when formatting a $B^\varepsilon$-tree, the node size B is a fixed design parameter that is determined once at the time the $B^\varepsilon$-tree is created. A larger node size increases write performance but decreases read performance and vice versa, so there is a tradeoff to consider when selecting the node size. An optimal node size and fan-out (number of child pointers) can be chosen if the workload is stable and known. However, the workload in a system is typically unpredictable and thus cannot be known ahead of time. By periodically re-computing the node size based on actual performance of the file system, a node size that best matches the current workload can always be chosen. When the workload becomes steady, the node size (vis-à-vis $B_{exp}$) will reach a suitable value. As the workload fluctuates, $B_{exp}$ will gradually change with the workload.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for a file system on a storage volume, the method comprising:
receiving an insert operation comprising a key and a value to be stored in a tree data structure of the file system, the tree data structure comprising a plurality of nodes organized in a hierarchy, each node having a buffer to store key-value pairs in a $B^+$-tree data structure comprising disk blocks allocated from the storage volume and characterized by a predetermined maximum buffer size;

adding the received key and value as a key-value pair to the B$^+$-tree in a root node of the tree data structure; and moving one or more key-value pairs from the B$^+$-tree in the root node to a B$^+$-tree in a child node of the root node when an amount of data stored in the B$^+$-tree of the root node is greater than the predetermined maximum buffer size, including allocating one or more disk blocks to the buffer of the child node as needed to store the one or more key-value pairs in the B$^+$-tree of the child node, wherein moving the one or more key-value pairs from the B$^+$-tree in the root node to the B$^+$-tree in the child node comprises:

producing a combined list of key-value pairs comprising the one or more key-value pairs from the B$^+$-tree in the root node and key-value pairs in the B$^+$-tree of the child node; and rebuilding the B$^+$-tree in the child node using the combined list of key-value pairs.

2. The method of claim 1, further comprising:

moving one or more key-value pairs from the B$^+$-tree in the child node to the B$^+$-tree in a descendent child node when the amount of data stored in the buffer of the child node is greater than the predetermined maximum buffer size; and deallocating any disk blocks comprising the buffer in the child node that become unused as a result of moving the one or more key-value pairs from the B$^+$-tree in the child node to the B$^+$-tree in the descendent child node.

3. The method of claim 1, further comprising performing a sorting operation of the one or more key-value pairs from the B$^+$-tree in the root node and the key-value pairs in the B$^+$-tree of the child node to produce the combined list of key-value pairs.

4. The method of claim 3, wherein the sorting operation is a merge sort operation.

5. The method of claim 1, wherein rebuilding the B$^+$-tree in the child node comprises bulk loading key-value pairs from the combined list of key-value pairs into the B$^+$-tree.

6. The method of claim 1, wherein rebuilding the B$^+$-tree in the child node includes loading its leaf nodes with key-value pairs from the combined list of key-value pairs such that at least all the leaf nodes other than a last leaf node are completely filled with key-value pairs.

7. The method of claim 1, wherein rebuilding the B$^+$-tree in the child node includes re-using disk blocks already allocated to the B$^+$-tree.

8. The method of claim 1, further comprising deallocating any disk blocks comprising the buffer of the root node that become unused as a result of moving the one or more key-value pairs from the B+-tree in the root node to the B+-tree in the child node.

9. A non-transitory computer-readable storage medium having stored thereon computer executable instructions, which when executed by a processor, cause the processor to:

receive an insert operation comprising a key and a value to be stored in a tree data structure of the file system, the tree data structure comprising a plurality of nodes organized in a hierarchy, each node having a buffer to store key-value pairs in a B$^+$-tree data structure comprising disk blocks allocated from the storage volume and characterized by a predetermined maximum buffer size;

add the received key and value as a key-value pair to the B$^+$-tree in a root node of the tree data structure; and move one or more key-value pairs from the B$^+$-tree in the root node to a B$^+$-tree in a child node of the root node when an amount of data stored in the B$^+$-tree of the root node is greater than the predetermined maximum buffer size, including allocating one or more disk blocks to the buffer of the child node as needed to store the one or more key-value pairs in the B$^+$-tree of the child node, wherein moving the one or more key-value pairs from the B$^+$-tree in the root node to the B$^+$-tree in the child node comprises:

producing a combined list of key-value pairs comprising the one or more key-value pairs from the B$^+$-tree in the root node and key-value pairs in the B$^+$-tree of the child node; and rebuilding the B$^+$-tree in the child node using the combined list of key-value pairs.

10. The non-transitory computer-readable storage medium of claim 9, wherein the computer executable instructions, which when executed by the processor, further cause the processor to:

move one or more key-value pairs from the B$^+$-tree in the child node to the B$^+$-tree in a descendent child node when the amount of data stored in the buffer of the child node is greater than the predetermined maximum buffer size; and deallocate any disk blocks comprising the buffer in the child node that become unused as a result of moving the one or more key-value pairs from the B$^+$-tree in the child node to the B$^+$-tree in the descendent child node.

11. The non-transitory computer-readable storage medium of claim 10, wherein the computer executable instructions, which when executed by the processor, further cause the processor to perform a merge sort of the one or more key-value pairs from the B$^+$-tree in the root node and the key-value pairs in the B$^+$-tree of the child node to produce the combined list of key-value pairs.

12. The non-transitory computer-readable storage medium of claim 10, wherein rebuilding the B$^+$-tree in the child node comprises bulk loading key-value pairs from the combined list of key-value pairs into the B$^+$-tree.

13. An apparatus comprising:

one or more computer processors; and a computer-readable storage medium comprising instructions for controlling the one or more computer processors to be operable to:

receive an insert operation comprising a key and a value to be stored in a tree data structure of the file system, the tree data structure comprising a plurality of nodes organized in a hierarchy, each node having a buffer to store key-value pairs in a B$^+$-tree data structure comprising disk blocks allocated from the storage volume and characterized by a predetermined maximum buffer size;

add the received key and value as a key-value pair to the B$^+$-tree in a root node of the tree data structure; and move one or more key-value pairs from the B$^+$-tree in the root node to a B$^+$-tree in a child node of the root node when an amount of data stored in the B$^+$-tree of the root node is greater than the predetermined maximum buffer size, including allocating one or more disk blocks to the buffer of the child node as needed to store the one or more key-value pairs in the B$^+$-tree of the child node, wherein moving the one or more key-value pairs from the B$^+$-tree in the root node to the B$^+$-tree in the child node comprises:

producing a combined list of key-value pairs comprising the one or more key-value pairs from the B$^+$-tree in the root node and key-value pairs in the B$^+$-tree of the child node; and rebuilding the B$^+$-tree in the child node using the combined list of key-value pairs.

14. The apparatus of claim 13, wherein the tree data structure is a B$^\varepsilon$-tree.

15. The apparatus of claim 13, wherein the computer-readable storage medium further comprises instructions for controlling the one or more computer processors to be operable to:
    move one or more key-value pairs from the B$^+$-tree in the child node to the Bt tree in a descendent child node when the amount of data stored in the buffer of the child node is greater than the predetermined maximum buffer size; and
    deallocate any disk blocks comprising the buffer in the child node that become unused as a result of moving the one or more key-value pairs from the B$^+$-tree in the child node to the B$^+$-tree in the descendent child node.

16. The apparatus of claim 13, wherein the computer-readable storage medium further comprises instructions for controlling the one or more computer processors to be operable to perform a merge sort of the one or more key-value pairs from the B$^+$-tree in the root node and the key-value pairs in the B$^+$-tree of the child node to produce the combined list of key-value pairs.

17. The apparatus of claim 13, wherein rebuilding the B$^+$-tree in the child node comprises bulk loading key-value pairs from the combined list of key-value pairs into the B$^+$-tree.

* * * * *